United States Patent [19]
Evans et al.

[11] Patent Number: 5,326,173
[45] Date of Patent: Jul. 5, 1994

[54] APPARATUS AND METHOD FOR REMOTE TEMPERATURE MEASUREMENT

[75] Inventors: Dan Evans; Matthew J. Fairlie; Karam Kang; Serge Zouikin, all of Kingston, Canada

[73] Assignee: Alcan International Limited, Montreal, Canada

[21] Appl. No.: 2,736

[22] Filed: Jan. 11, 1993

[51] Int. Cl.$^5$ .......................... G01K 13/06; G01J 5/10
[52] U.S. Cl. .......................................... 374/128; 374/9; 374/126; 374/127; 374/131; 374/125; 374/161; 250/341
[58] Field of Search .................. 374/9, 126, 127, 128, 374/129, 131, 161, 125; 356/43, 44, 45; 250/338.1, 341

[56] References Cited

U.S. PATENT DOCUMENTS

| | | | |
|---|---|---|---|
| 3,433,052 | 3/1969 | Maley | 374/129 |
| 3,439,985 | 4/1969 | Comstock, Jr. et al. | 374/9 |
| 3,462,224 | 8/1969 | Woods et al. | 374/9 |
| 3,796,099 | 3/1974 | Shimotsuma | 374/9 |
| 4,172,383 | 10/1979 | Iuchi | 374/9 |
| 4,465,382 | 8/1984 | Iuchi et al. | 374/126 |
| 4,579,461 | 4/1986 | Rudolph | 374/9 |
| 4,880,314 | 11/1989 | Kienitz | 374/129 |
| 4,979,133 | 12/1990 | Arima et al. | 374/9 |
| 4,984,902 | 1/1991 | Crowley et al. | 374/1 |
| 5,021,980 | 6/1991 | Poenisch et al. | 374/9 |
| 5,154,512 | 10/1992 | Schietinger et al. | 374/126 |

FOREIGN PATENT DOCUMENTS

| | | | |
|---|---|---|---|
| 0122924 | 9/1981 | Japan | 374/128 |
| 0161521 | 10/1982 | Japan | 374/126 |
| 0621882 | 4/1949 | United Kingdom | 374/126 |
| 1207984 | 10/1970 | United Kingdom | 374/128 |

OTHER PUBLICATIONS

Korobko, I. M. et al., "Low Temperature Pyrometer," Meas. Tech. (USA), No. 10 (Oct. 1969).
Schietinger et al.—Material Research Society Spring, 1991 Meeting—"Ripple Technique; A Novel Non--Contact Wafer Emissivity..."—pp. 1–10, No. 22 (Apr. 1991).
Krapez et al.—Meas. Sci. Technol. 1 (1990) pp. 857–864, "A double-wedge reflector for emissivity enhanced pyrometry."
Krapez et al.—SPIE vol. 1320–Infrared Tech. & Applications (1990) pp. 186–201., "Reflecting-cavity IR temperature sensors: an analysis of spherical, conical, and double-wedge geometries."

*Primary Examiner*—Diego F. F. Gutierrez
*Attorney, Agent, or Firm*—Cooper & Dunham

[57]  ABSTRACT

An apparatus and method for remotely measuring emissivity and hence temperature of a surface of an object. The apparatus includes a detector having a radiation receptor for measuring infra-red radiation, an integrating cavity surrounding the receptor for receiving radiation from a surface facing the cavity and delivering the radiation to the receptor, at least two sources of infra-red containing radiation (e.g. light from an incandescent lamp) within the integrating cavity positioned to produce separate beams of the radiation which strike the surface at different angles suitable for reflection to the receptor, and a processor for determining the temperature of the surface from the radiation measured by the detecting means. The use of at least two mutually angled radiation beams compensates for surface anisotropy of the surface whose temperature is to be measured. The infra-red containing radiation is modulated to cause an on/off fluctuation of the intensity of the radiation so that the component of the signal from the detector resulting from reflected radiation can be distinguished from the component due to radiation emitted from the surface due to its temperature. The radiation is preferably measured at two different wavelengths so that a ratio technique may be employed. The resulting measurements can be used to determine the reflectivity, and hence the emissivity, of the surface as well as the intensity of emitted radiation, so that accurate temperature measurements can be made from standard formulae used for optical pyrometry.

21 Claims, 4 Drawing Sheets

APPARATUS AND METHOD FOR REMOTE TEMPERATURE MEASUREMENT

BACKGROUND OF THE INVENTION

I. Field of the Invention

This invention relates to apparatus and methods for remote measurement of the surface temperatures of objects, e.g. moving metal sheets in metal fabrication or treatment plants and the like.

II. Description of the Prior Art

In many industries it is necessary to obtain an accurate measurement of the surface temperatures of objects but the nature of those objects, or the manner in which they are handled, makes it difficult or impossible to use temperature measurement means which require direct contact with the objects themselves, e.g. thermocouples or the like. For example, in metal rolling plants, heated metal sheets, rods or bars are often passed rapidly through fabrication equipment so that contact methods of temperature measurement are impractical.

In such cases, optical pyrometry is often used for remote temperature measurement. This involves measuring infra-red radiation emitted from the surface of the object as an indication of the temperature of the surface.

Optical pyrometers normally work by measuring the amount of radiation emitted in a certain spectral band (or bands) from the surface to be measured. The emitted radiation can be described quantitatively by the Stefan-Boltzmann law, which states that the radiant energy equals the emissivity times the Stefan-Boltzmann constant $(5.7 \times 10^{-8} Wm^{-2} K^4)$ times the temperature to the fourth power.

The hemispherical spectral content of the radiation of a black body can be determined using Planck's radiation formula, namely:

$$W_{\lambda b} = \frac{2\pi hc^2}{\lambda^5 (e^{hc/\lambda Kt} - 1)}$$

wherein, $W_{\lambda b}$ = the black body spectral emittance with a spectral interval of 1 $\mu m$, W/cm² $\mu m$ T = absolute temperature, °K.

$\kappa$ = Boltzman's constant = $1.4 \times 10^{-23}$ JL$^{-1}$ h = Planck's constant = $6.6 \times 10^{-34}$ J·sec c = velocity of light = $3 \times 10^8$ m/sec.

Since the amount of radiation emitted and the spectral distribution of the radiation can be measured, it is theoretically possible to determine the temperature of a body for emissivity $\epsilon$ from the measured radiation. In practice, however, emissivity is not a known constant and is, in fact, not a constant at all but a function of wavelength and temperature. Accordingly, to use pyrometry to measure temperatures accurately, the system must be calibrated to enable it to compensate for emissivity changes.

There are, however, many problems with this technique which lead to significant inaccuracies. Apart from the possibility of measuring stray radiation from nearby hot spots as well as the intended radiation from the surface under measurement, there is the problem that inaccuracies may arise from spectrally-selective atmospheric absorption. Furthermore, unpredictable variations in surface emissivity may arise due to surface roughness, surface conditions (degree of oxidation, etc.) and variations due to the measurement of different materials.

One attempt to improve accuracy has been to use a dual wavelength radiometer. This arrangement, also known as a ratio pyrometer, measures the quantity of radiation emitted by the surface to be measured at two different wavelengths or wavelength bands. An algorithm ratios the signals from the two wavelengths and determines the temperature accordingly. While this procedure theoretically makes temperature measurement independent of the emissivity of the surface, this would only be the case if the emissivity at both wavelengths were the same or is known to change with a constant relationship. However, this is not the case in practice.

Another attempt to improve accuracy has involved the use of an integrating cavity. This is a concave cavity having a reflective inner surface which is placed close to the surface to be measured. Radiation from an enlarged area of the surface covered by the cavity undergoes multiple reflections before it enters the focal zone of the receptor, thus reducing the sensitivity of the pyrometer to changes in surface emissivity and improving the signal to noise ratio. The integrating cavity also has the additional benefit of shielding the sensor from stray heat sources.

Further improvements have been made by measuring the reflectivity of the surface to be measured by directing infra red-containing light from an incandescent light source onto the surface and measuring the intensity of the reflected light. The measured reflectivity can then be used as an indication of surface emissivity because reflectivity is related to emissivity by the formula:

$$\epsilon = 1 - \rho$$

wherein:

$\epsilon$ = emissivity, and $\rho$ = reflectivity.

Consequently, if the reflectivity can be measured for the surface at a particular temperature, the emissivity can be calculated and this can be used to determine the surface temperature with improved accuracy.

If the total reflected radiation from the surface to be measured is collected at the same time as radiation emitted from the surface, a combined signal is produced by the pyrometer. In order to distinguish the component of the combined signal due to the reflected light from the component due to radiation emitted from the surface, a so-called "ripple technique" has been developed (see Schietlinger et. al., technical notes from Material Research Society Spring, 1991 Meeting, the disclosure of which is incorporated herein by reference) in which a rapid variation in intensity of the light due to the use of an alternating current to power the light source is employed as a signature of the reflected component. The ratio of the magnitude of the ripple in the incident light from the source to the magnitude of the ripple detected in the output from the pyrometer indicates the ratio of incident light to reflected light. Hence the reflectivity can be determined and used to provide a value for the emissivity.

Despite these refinements, it is still found that the degree of inaccuracy in the temperature measurements may be as high as ±10° C. for commercial pyrometers, which is too high for practical value in many cases, particularly when the temperatures of moving metal surfaces within the range of less than about 400° C. are to be measured.

In such cases, the infra-red radiation emitted from the surface to be measured is quite weak and signal to noise ratios in the outputs from the measuring devices may consequently be quite low. Moreover, the movement of the surface to be measured in one direction causes an incident light reflection problem when the surface is anisotropic, as in the case of rolled metal sheets. Anisotropy may result from the presence of directional surface patterns such that a cross-section of the surface taken in one direction exhibits a different two-dimensional configuration than a cross-section taken at an angle to the first direction (e.g. 90° ). The principal anisotropic features of metal sheets are the rolling lines which run parallel to the sides of the sheets.

OBJECTS OF THE INVENTION

An object of the present invention is to provide an apparatus and method for the remote measuring of surface temperatures using an optical pyrometer in which temperature measurements of high and reliable accuracy can be obtained.

Another object of the invention is to provide an apparatus and method for accurately determining emissivity from a surface using integrated reflectivity.

Yet another object of the invention is to provide such an apparatus and method that is particularly suitable for the emissivity and temperature measurement of anisotropic moving surfaces, e.g. the surfaces of moving sheet material.

Still another object is to provide such an apparatus and method that can compensate for irregularities arising from the movement of the surface to be measured in one direction only.

SUMMARY OF THE INVENTION

According to one aspect of the invention, there is provided an apparatus for remotely measuring a temperature of a moving anisotropic surface, comprising detector means including a radiation receptor for detecting infra-red radiation emitted and reflected by said surface; an integrating cavity at least partially surrounding said receptor for receiving radiation emitted and reflected by said moving surface, when facing said cavity, and delivering said radiation to said receptor; means for generating at least two infra-red radiation-containing beams within said integrating cavity positioned to cause said beams to strike said surface from different directions and at angles suitable for at least partial reflection to said receptor; and means for determining said temperature of said surface from said radiation detected by said detector means.

According to another aspect of the invention, there is provided a method of remotely measuring emissivity and hence temperature of a moving anisotropic surface, which comprises directing at least two infra-red radiation-containing beams from within an integrating cavity onto said surface at mutually different angles; collecting radiation from said beams reflected from said surface together with infra-red radiation emitted by said surface within said integrating cavity; measuring an intensity of said reflected and emitted radiation; and determining said temperature of said surface from said measured intensity.

By using radiation directed onto said surface in at least two separate, mutually angled beams to determine a constant of reflectivity and hence emissivity of said surface, a more accurate temperature determination can be made (e.g. ±5° C. 3σ or less), especially at temperatures below about 595° C. and particularly in the ranges of 120°–180° C., 295°–530° C. and 185°–595° C. The overall operating range of the apparatus is, however, generally about 85°–700° C.

The invention is particularly suitable for measuring the surface temperature of moving sheets of metal, such as aluminum or aluminum alloys, in rolling mills or on continuous annealing lines, etc.

DETAILED DESCRIPTION OF THE INVENTION AND PREFERRED EMBODIMENTS

In the present invention, the accuracy of measuring the temperature of moving anisotropic surfaces is improved by employing an integrating cavity provided with means for producing at least two non-parallel directional infra-red radiation-containing beams (e.g. light beams from an incandescent source) within the cavity itself for direct measurement of the reflectivity of the surface with compensation for the surface irregularities. At the same time, the radiation emitted from the surface due to its temperature is collected and measured. The incident radiation is preferably varied, e.g. chopped by a mechanical chopper or optoelectrical switch, to produce alternating "on" and "off" cycles in the incident radiation. During the "off" cycle, only the emitted radiation intensity ($I_e$) is measured and during the "on" cycle both the reflected radiation ($I_r$) and emitted radiation ($I_e$) are measured. The difference in measured intensity between the "on" cycle and the "off" cycle gives the reflected radiation. This is done at two wavelengths to obtain a reflection coefficient (Ph) at each wavelength. The reflection coefficient is given by the ratio of intensity from the surface ($I_r$) and from a perfectly reflecting mirror ($I_m$). The value $I_m$ is a constant obtained by initial calibration by referencing the sensor system to a mirror.

Figure 1A:
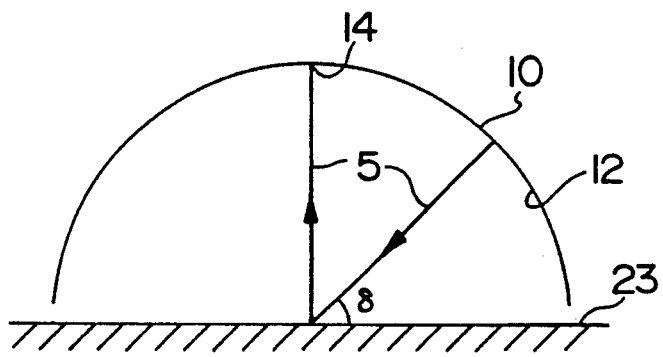
FIG. 1A is a simplified vertical cross-sectional view of an apparatus according to one form of the present invention.
Figure 1B:
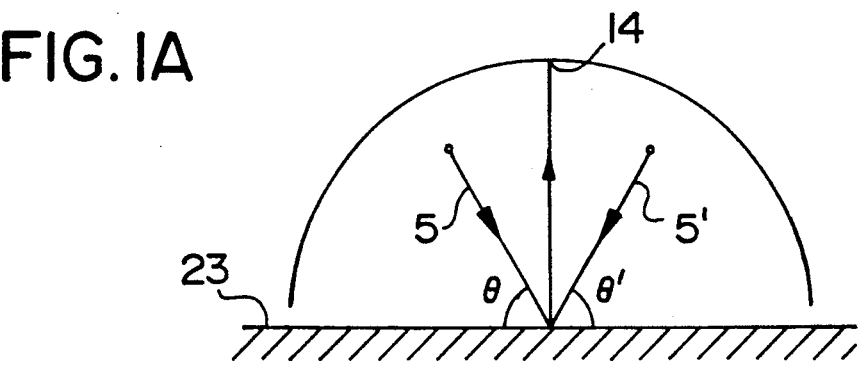
FIG. 1B is a cross-sectional view similar to FIG. 1A but taken along a vertical plane oriented at about 45° to the vertical plane of FIG. 1A.

As shown in simplified form in FIGS. 1A and 1B, the integrating cavity 10 is preferably hemispherical so that radiation from a surface 23 to be measured is focussed or concentrated onto a receptor 14 positioned within the cavity, usually at the innermost central point. However, the cavity could be of any other shape capable of producing an equivalent focussing or concentrating effect, e.g. a cone, a parabola, a cylinder, etc.

In the most simple case illustrated in FIGS. 1A and 1B, two IR-containing light beams 5 and 5' are generated within the integrating cavity 10, although only one beam 5 is shown in FIG. 1A because the second beam is directed into the cavity in such a way that components of the light beams parallel to the surface 23 are oriented at a right angle to the first (i.e. the second beam is directed towards or away from the observer) and is thus not visible in the illustrated cross-section. As shown in FIG. 1B, each light beam strikes the surface 23 from different directions and at angles $\theta$ and $\theta'$ between the beams and the surface 23 that are greater than or equal to 45°. This ensures that a large percentage of the light reflected from the surface 23 reaches receptor 14 via a reflective inner surface 12 of the cavity.

Figure 2A:
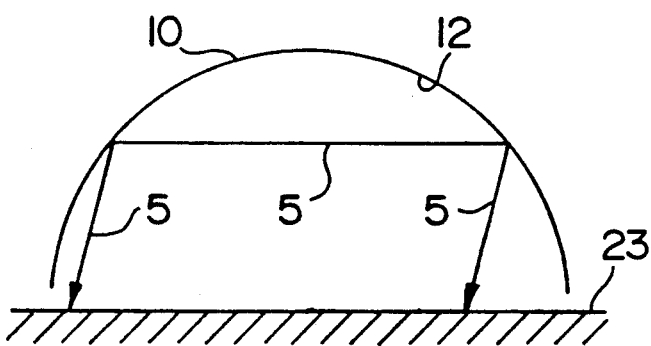
FIG. 2A is a view similar to FIG. 1 showing a way of using a reflected beam to illuminate the surface.

Usually, the light beams are directed onto the surface 23 without first being reflected off the internal surface 12 of the integrating cavity. If desired, however, the internal surface 12 may be used to reflect the light prior to the light being directed onto the surface, e.g. in the manner shown in FIG. 2A, in order to produce a further beam directed onto the surface from a different direction.

The integrating cavity 10 serves as a means of capturing as much of the light reflected back from the metal surface 23 as possible and directing the light to the receptor 14. To achieve this objective, the light is usually reflected many times within the cavity before reaching the receptor.

The provision of at least two non-parallel light beams directly within the integrating cavity for measuring surface reflectivity overcomes inaccuracies produced by surface anisotropy for the following reasons. The scatter pattern produced by light from a single source reflected from the moving surface varies with time due to surface anisotropy so that the integrating cavity fails to collect all of the radiation reflected from the surface and an inaccuracy is produced in the generated signal. When beams of light are directed onto the surface from different directions (preferably at right angles when viewed from directly above the surface, i.e. when considering components of the light beams projected onto a plane parallel to the surface 23), the scatter pattern of one of the beams tends to remain unchanged when the scatter pattern of the other varies due to the surface anisotropy, so the degree of inaccuracy in the detected signal is reduced.

Figure 2B:
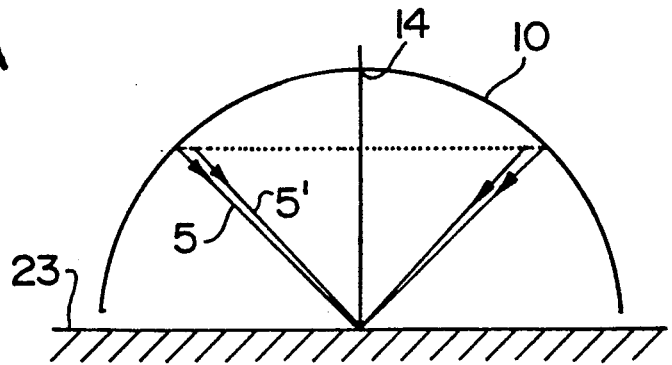
FIG. 2B is another view similar to FIGS. 1A and 1B but showing a ring of light beams forming a diffuse annular light source.

The inaccuracy can be reduced even further by employing more than two beams of light arranged to illuminate the surface from several different directions. In fact, it may be desirable to employ a continuous diffuse annular ring of light beams, e.g. beams directed from a continuum of point light sources positioned on a circle within the integrating cavity, to illuminate the surface. An arrangement of this type is illustrated in simplified form in FIG. 2B, showing a few sample light beams 5, 5', etc. from the multiple sources. As the surface moves in the intended direction, there is usually a small degree of transverse motion, and also some flutter (up and down motion), so that are frequent occurrences of simultaneous multi-directional surface movement. A diffuse ring of lights produces an infinite series of scatter patterns such that an entire reflected component may be captured by the integrating cavity at any particular time regardless of how complex the motion of the surface may be.

To make it possible for the use of more than one light beam to improve the accuracy to the extent contemplated by the invention, the light beams must emanate from within the integrating cavity rather than from outside. This permits a much better integrating effect of the reflected signals and a higher signal to noise ratio.

As will be appreciated, the use of a hemispherical integrating cavity produces measured surface reflectivities and emissivities very different from those measured directly without assistance from such a cavity. By measuring the reflectance of the surface from light shone inside the integrating cavity, the hemispherical reflectivity ($\rho_h$) can be inferred, from which the hemispherical emissivity ($\epsilon_h$) can be calculated using the Kirchhoff Law:

$$\epsilon_h = 1 - \rho_h$$

and hence the emissivity ratio (R) for the two wavelengths at which the radiation is measured can be calculated as follows:

$$R = \left(\frac{\epsilon_h^{(1)}}{\epsilon_h^{(2)}}\right) = \frac{1 - \rho_h^{(1)}}{1 - \rho_h^{(2)}} = \frac{1 - \frac{I_r^{(1)}}{I_m^{(1)}}}{1 - \frac{I_r^{(2)}}{I_m^{(2)}}}$$

Figure 3:
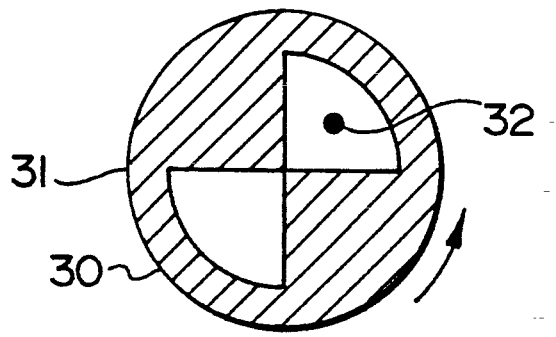
FIG. 3 is a schematic representation of a chopper wheel device used for modulating the signals between the intensity of the emitted radiation and the combined intensity of the emitted radiation and the reflected light.
Figure 4:
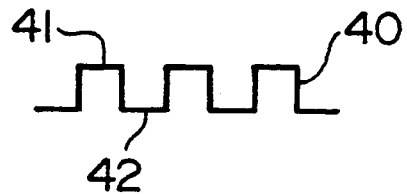
FIG. 4 shows a pulse of the type produced by the device of FIG. 3.

As indicated briefly above, in order to distinguish the components of the detector signal due to reflected light from those due to surface radiation, a modulation technique is used. This technique involves modifying the incident light to provide a "full on" to "full off" pattern, e.g. with a square wave modulation. FIG. 3 illustrates a "chopper wheel" 30 which can be used to generate such a modulation. The chopper wheel 30 is a circular plate 31 which rotates in the direction shown by the arrow in front of light a source 32. The square wave yields incident light pulses that strike the surface and are reflected in combination with the emitted radiation. As a result, as illustrated in FIG. 4, the detector sees a radiation signal 40 comprising a series of square wave peaks 41 made up of both reflected and emitted radiation, against a background 42 of emitted radiation only.

Since the reflected light is either present or absent according to this pattern, the value of this component in the signal from the receptor can be calculated directly. The incident component is a known quantity which can simply be entered into the calculation.

Having described the invention in rather general terms, a preferred embodiment is described in more detail below with reference to FIGS. 5 and 6 of the accompanying drawings.

Figure 6:
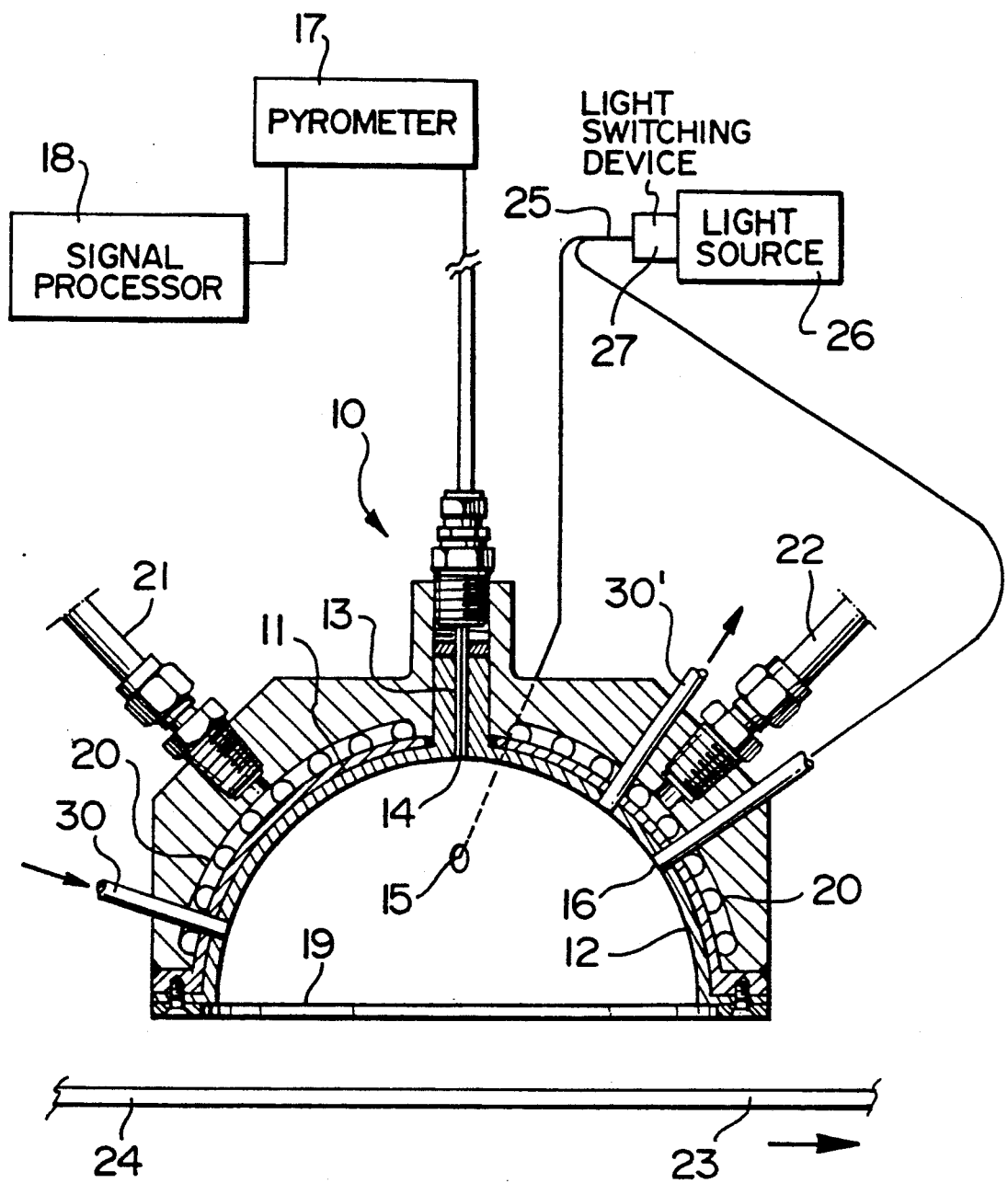
FIG. 6 is a cross-sectional side view of the cavity of FIG. 5, but also showing a metal sheet having a surface to be measured and also showing additional equipment forming part of the apparatus.

Referring first to FIG. 6, the illustrated apparatus comprises an integrating cavity 10 in the form of a hollow hemisphere 11 having a specular internal surface forming a reflector 12. The innermost point of the cavity 10 has a hole 13 through which an optical fiber 14 extends sufficiently to receive radiation reflected from the reflector 12 at its exposed end, thus acting as a radiation receptor. The optical fiber 14 is connected to a remote pyrometer 17 containing at least two radiation detectors (not shown) which measure the intensity of the radiation passing along the fiber at two different wavelengths or in two different wavelength bands.

Two further optical fibers 15 and 16 project through holes in the cavity 10 at spaced positions on the surface of the reflector 12. The fibers 15 and 16 are in fact respective ends of a bifurcated optical fiber 25 connected to a lamp unit 26 which acts as a light source and directs infra-red radiation-containing light through the fibers 25, 15 and 16 into the interior of the cavity 10 in the form of two mutually unaligned beams (not shown, but refer to FIGS. 1A and 1B). The lamp unit 26 is preferably an incandescent light source, but could be any source of light containing infra-red energy at the wavelengths at which the emissivity is to be determined and having a band width at least as wide as band filters used in the detectors.

The light from the unit 26 passes through a chopper wheel of the type described earlier or an opto-electrical switching device 27 which introduces the desired square wave modification into the light.

Figure 5:
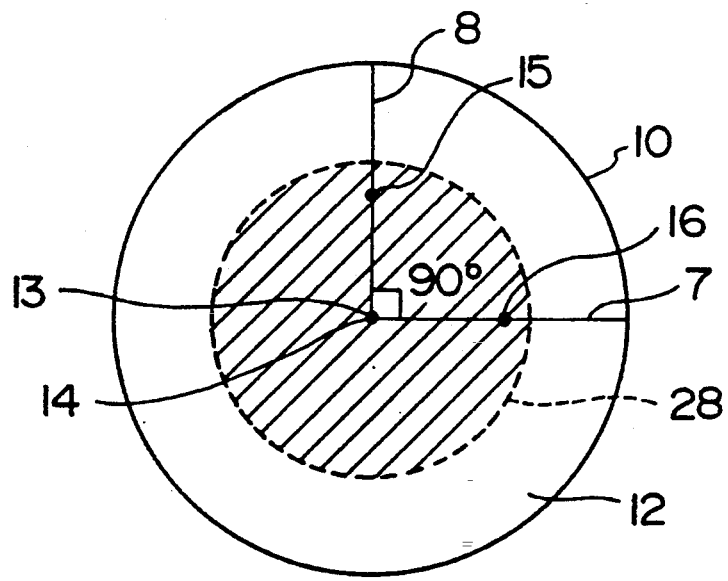
FIG. 5 is a top plan view of an integrating cavity used in apparatus according to one embodiment of the present invention.

Referring to FIG. 5, the two optical fibers 15 and 16 acting as light sources are preferably positioned on the internal surface 12 at positions within (i.e. above, in the illustrated orientation of the apparatus) an imaginary line 28 (indicated by a broken line) representing a circle inscribed on the surface 12 around the central fiber 14 at a position such that one half (an innermost half) of the internal surface area of the cavity is located within (above) the circle and the remaining half (an innermost half) is located outside (below) the circle. The fibers 15 and 16 are also positioned on mutually orthogonal central vertical planes, i.e. orthogonal radii 7 and 8, of the hemispherical cavity at about the same distance between the central point and the outer end of the cavity and are angled in the manner indicated in FIG. 1 with respect to the surface 23 of a body 24, e.g. a heated anisotropic aluminum sheet, moving relative to the cavity in the direction of the arrow shown in FIG. 6.

The opening at the outer opening of the cavity is closed by a quartz plate 19 forming a radiation transmitting cover which allows both infra-red radiation and visible light to pass into and out of the interior of the cavity 10.

A series of water-cooled tubes 20 is arranged around the outside of the cavity 10 in order to prevent overheating of the cavity surfaces and the optical fibers. It is particularly important to keep the temperature of the reflector 12 constant otherwise the thermal emission of this surface becomes a factor in calculating the temperature. Cooling water is fed into the tubes via inlet pipe 21 and out of the tubes via outlet pipe 22.

Means for introducing a dry purging gas into the interior of the cavity, such as dry gas inlet 30 and outlet 30', is provided in order to expel air containing moisture that might otherwise condense on the reflector 12 due to the cooling produced by tubes 20.

The device is operated by positioning the outer open end of the cavity 10 close to, but at a slight distance from the surface 23. Two mutually angled beams of light from the optical fibers 15 and 16 are incident on the surface 23 from different directions. A proportion of the incident light is reflected from the surface 23 back into the interior of the cavity and is focused onto the central optical fiber 14 by the reflective inner surface 12. The light passes through the fiber 14, acting as a receptor, to the pyrometer 17 for measurement at two different wavelengths. The outputs from the pyrometer are fed to a signal processor 18 to calculate and display the measured surface temperature making use of the modulation technique indicated earlier to calculate reflectivity and hence emissivity, and thereby surface temperature.

As explained, the positioning of the fibers 15 and 16 is such that the beams of light strike the surface 23 from two different directions, thereby enabling the apparatus to automatically compensate for variations in the topography of the surface 23 and the unidirectional movement of the surface.

The distance between the outer end of the integrating cavity 11 and the surface 23 to be measured should be maintained constant within ±10% in order to avoid introducing inaccuracies into the output from the pyrometer 17. In general, it has been found desirable to make this standoff distance about one quarter of the inside diameter of the integrating cavity.

Standard factory black body calibration is needed to determine the calibration constants for the optical system, as will be understood by the skilled practitioner. Additionally, immediately before use, and preferably periodically during use, the apparatus is calibrated using a high quality mirror kept at room temperature as a reference source. The reference source does not have to be heated in order to perform the calibration since the energy required to calibrate the device is derived solely from the light sources provided within the integrating cavity. To perform the calibration, the integrating cavity is moved, either automatically or manually, over the reference source from time to time. Experience dictates how frequently such calibration is required during use of the apparatus.

Figure 7:
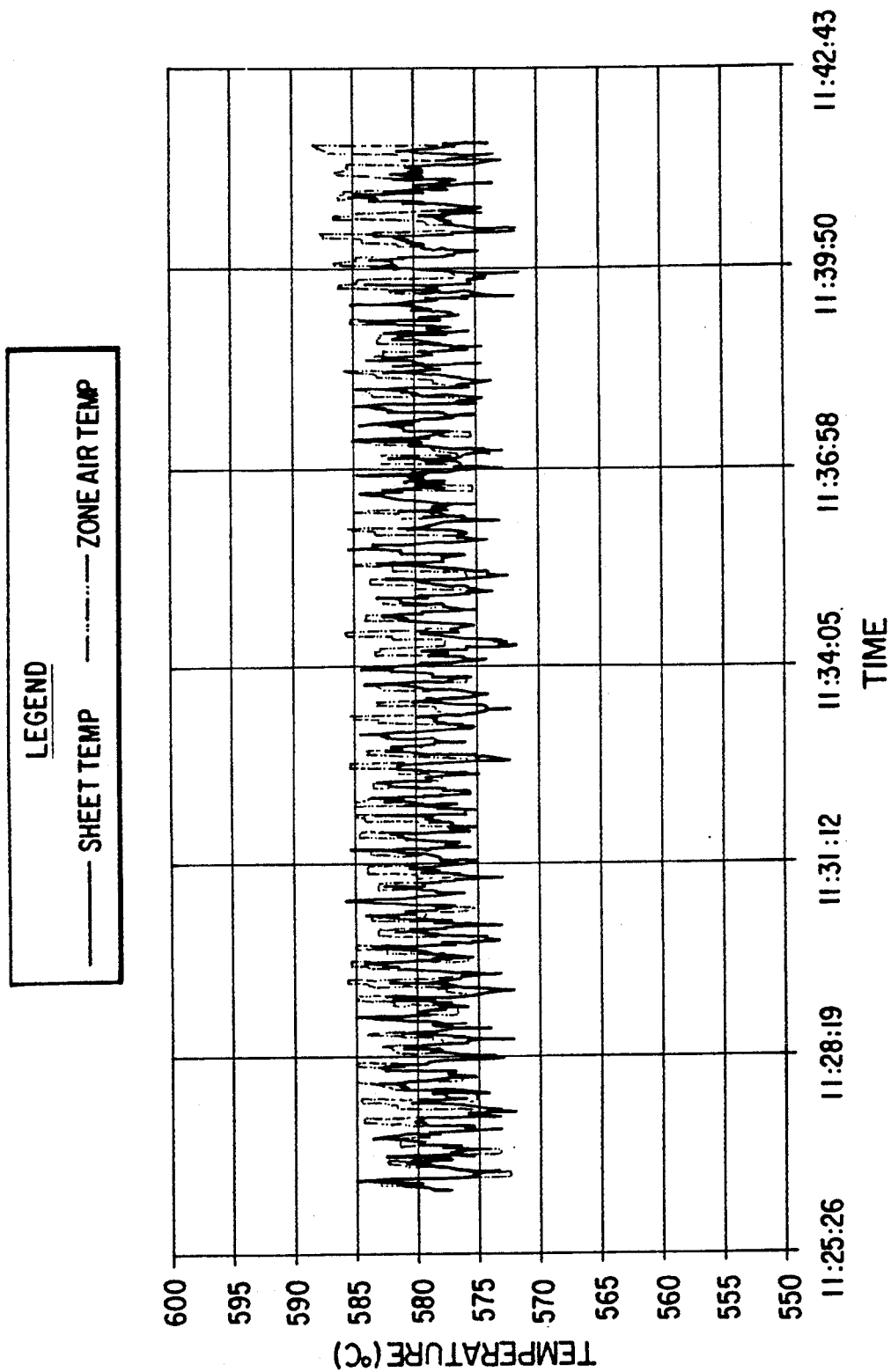
FIG. 7 is a graph showing sheet temperatures measured on-line in an annealing solution heat treatment application by part of the apparatus according to the invention and air temperatures in the furnace measured by a thermocouple.

FIG. 7 shows the output of a sensor according to the invention tested on-line in a metal annealing facility. The metal sheet temperature as measured by the apparatus oscillates at ±5° C. with the same frequency and amplitude as a control thermocouple measuring the air temperature in the furnace. This demonstrates the fast response of the system which is a requirement for good process control.

While a specific embodiment of the invention has been described in detail above, it will be appreciated by persons skilled in the art that various modifications and alternations may be made thereto without departing from the spirit of the invention.

What we claim is:

1. An apparatus for remotely measuring a temperature of a moving anisotropic surface, comprising:
    detector means including a radiation receptor for detecting infra-red radiation emitted and reflected by said surface;
    an integrating cavity at least partially surrounding said receptor for receiving radiation emitted and reflected by said moving surface, when facing said cavity, and delivering said radiation to said receptor;
    means for generating at least two infra-red radiation-containing beams within said integrating cavity positioned to cause said beams to strike said surface from different directions and at angles suitable for at least partial reflection to said receptor; and
    means for determining said temperature of said surface from said radiation detected by said detector means.

2. Apparatus according to claim 1 wherein said means for generating at least two beams are positioned such that, in use, two of said beams have components in a plane parallel to said moving surface oriented substantially at a right angle to each other.

3. Apparatus according to claim 2 wherein said component of a first one of said two beams is oriented substantially parallel to a direction of movement of said surface and said component of a second one of said two beams is oriented substantially at a right angle to said direction of movement.

4. Apparatus according to claim 1 wherein said integrating cavity has a substantially hemispherical internal surface and wherein said means for generating at least two beams are positioned on an innermost half of the internal surface of the integrating cavity on mutually orthogonal central planes of said cavity.

5. Apparatus according to claim 1 wherein said means for generating at least two beams comprise a diffuse annular light source within said cavity.

6. Apparatus according to claim 1 including means for varying intensities of said beams with a recognizable pattern such that a component of said radiation detected by said detector means corresponding to radiation from said beams can be measured and distinguished from a component of said radiation detected by said detector means corresponding to radiation emitted from said surface due to a temperature thereof.

7. Apparatus according to claim 6 wherein said recognizable pattern is a square wave.

8. Apparatus according to claim 1 wherein said integrating cavity comprises a hollow hemisphere.

9. Apparatus according to claim 1 wherein said integrating cavity has an internal hemispherical reflective surface.

10. Apparatus according to claim 1 including cooling means disposed around said integrating cavity.

11. Apparatus according to claim 1 including a radiation-transmitting cover closing an outer opening of said cavity facing, in use, said moving surface.

12. Apparatus according to claim 1 including gas purging means for introducing a dry gas into said integrating cavity to prevent moisture condensation therein.

13. Apparatus according to claim 1 wherein said means for generating at least two beams within said integrating cavity comprise optical fibers each connected to an incandescent light source positioned remotely of said integrating cavity.

14. Apparatus according to claim 1 wherein said detector means include at least one radiation detector positioned remotely of said integrating cavity and wherein an optical fiber acts as said receptor and conveys said radiation to said detector.

15. Apparatus according to claim 1 wherein said detector means includes detectors for measuring radiation intensity at two different wavelengths or within two different wavelength bands.

16. Apparatus according to claim 15 wherein said means for determining said temperature comprises means for comparing said intensities measured at said different wavelengths or wavelength bands and means for computing said surface temperature therefrom.

17. A method of remotely measuring a temperature of a moving anisotropic surface, comprising:
directing at least two infra-red radiation-containing beams from within an integrating cavity onto said surface from different directions and at angles that result in at least partial reflection of said beams into said cavity;
collecting within said integrating cavity radiation from said beams reflected by said surface together with infra-red radiation emitted by said surface due to said temperature of said surface to produce combined radiation having an intensity;
measuring the intensity of said combined radiation; and
calculating said temperature of said surface from said measured intensity.

18. A method according to claim 17 wherein two radiation beams are directed onto said surface in such a way that components of said beams in a plane parallel to said surface are oriented generally at a right angle to each other.

19. A method according to claim 18 wherein said surface is moving in a first direction and wherein said component of a first of said two beams is oriented in said first direction and said component of a second of said two beams is oriented at a right angle to said first direction.

20. A method according to claim 17 wherein said beams are varied in intensity in order to allow a component in said measured radiation originating from said beams to be distinguished from a component in said radiation due to said temperature of said surface, and wherein a reflectivity value of said surface is calculated from said component originating from said beams, said reflectivity value is used to calculate an emissivity value of said surface, and said emissivity value is employed for calculating said temperature.

21. A method according to claim 17 wherein said intensity of said combined radiation is measured at two different wavelengths and said temperature of said surface is calculated from a ratio of said measured intensities.

* * * * *